Dec. 9, 1930.  C. C. VAN NUYS ET AL  1,784,120
SEPARATION OF THE CONSTITUENTS OF GASEOUS MIXTURES
Filed Oct. 23, 1926
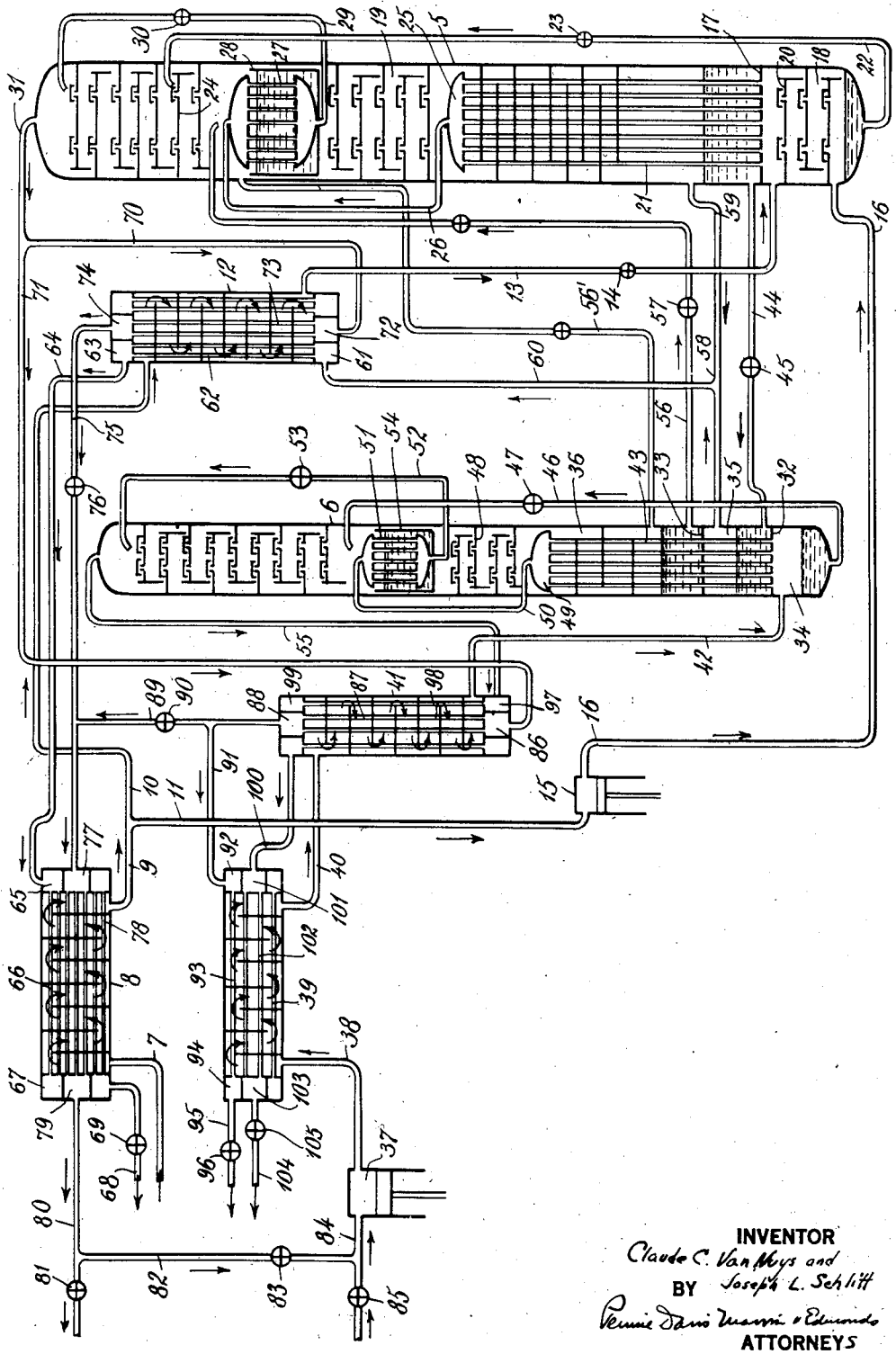
INVENTOR
Claude C. Van Nuys and
BY  Joseph L. Schlitt
Pennie Davis Marvin & Edmonds
ATTORNEYS Patented Dec. 9, 1930

1,784,120

UNITED STATES PATENT OFFICE

CLAUDE C. VAN NUYS, OF CRANFORD, AND JOSEPH L. SCHLITT, OF ELIZABETH, NEW JERSEY, ASSIGNORS TO AIR REDUCTION COMPANY, INCORPORATED, OF NEW YORK, N. Y., A CORPORATION OF NEW YORK

SEPARATION OF THE CONSTITUENTS OF GASEOUS MIXTURES

Application filed October 23, 1926. Serial No. 143,594.

This invention relates to the separation of the constituents of gaseous mixtures, and particularly to a method and apparatus permitting the recovery of two constituents of such a mixture in substantial purity. The invention can be employed in the recovery of oxygen and nitrogen from the atmosphere and in the treatment of other gaseous mixtures in which the constituents bear similar relations.

In order that the invention may be more clearly understood, it will be discussed hereinafter more especially with relation to the problem of separating oxygen and nitrogen from air. The recovery of oxygen and nitrogen is a commercial operation which has been carried out for some time by methods and in apparatus which are well known. The air is compressed, purified and cooled and is then liquefied. The liquid is subjected to rectification in which the more volatile constituent, nitrogen, separates from a liquid containing oxygen. The oxygen liquid is then vaporized to produce the oxygen product. Argon, which is present in the proportion of about 1% in the atmosphere, may be removed with the oxygen or nitrogen and it can be recovered separately by the application of a special procedure adapted for that purpose. The presence and separation of argon is not a matter of material importance in connection with the present invention. The other constituents of the atmosphere are present in such relatively slight proportions that they need not be here considered.

In the separation of oxygen and nitrogen by rectification of a liquid, it has not been possible to recover both constituents in a substantially pure condition. Owing to the nature of the rectification operation and the characteristics of the gases involved, it is necessary to evaporate some of the oxygen in order to ensure the complete absence of nitrogen from the liquid resulting from the rectification or, on the other hand, to liquefy some of the nitrogen so that the nitrogen product may be free from oxygen. The rectification may be conducted in either way to produce one of the constituents in a substantially pure condition.

It is the object of the present invention to provide a method of and apparatus for separating the constituents of gaseous mixtures whereby two of the constituents can be recovered economically in substantial purity. The invention permits the separation of the constituents and the continuous withdrawal thereof and consequently affords a source of two gases such as oxygen and nitrogen.

Other objects and advantages of the invention will be apparent as it is better understood by reference to the following specification and accompanying drawing in which a preferred form of apparatus capable of use in applying the invention is illustrated diagrammatically. Details of the apparatus which are well known to those skilled in the art are omitted for the purpose of clarity.

In carrying out the invention the gaseous mixture after compression, purification and cooling in the usual way, is subjected to liquefaction and rectification. The primary rectification is conducted so as to produce a liquid containing the less volatile constituent in substantial purity, that is to say, if air is treated the rectification is controlled to provide a pure oxygen liquid. Necessarily the nitrogen which forms the effluent from the rectification is contaminated by more or less oxygen which is vaporized and utilized in the rectification to ensure the separation of all of the nitrogen.

To accomplish the purpose of the invention the impure nitrogen effluent is withdrawn and a portion thereof, either with or without the addition of air, is compressed to a lower pressure than that initially employed, and after cooling this gaseous mixture is subjected to liquefaction and rectification in an auxiliary apparatus. In conducting the auxiliary operation the rectification is controlled so as to produce an effluent containing the more volatile constituent, for example, nitrogen and an impure liquid, for example, oxygen containing some nitrogen. The impure liquid is then delivered to the primary rectifier at a suitable level therein and is separated so that the oxygen content joins that normally produced by the primary rectification and augments the quantity of pure liquid oxygen which is evaporated subsequently and forms the oxygen product of the operation. The nitrogen or other constituent of higher volatility is separately withdrawn and recovered. The quality of the gaseous product of the auxiliary rectification can be improved by diverting a portion of the vapor arising from the impure liquid at the lower end of the rectifier to the primary rectification. This vapor which is in phase equilibrium with the impure liquid should enter the primary column at approximately the level where the liquid is introduced. In place of using the effluent from the primary rectification for recompression and treatment in the auxiliary rectification either with or without the addition of further quantities of the gaseous mixture such as air to be treated, the unseparated mixture may be introduced to the auxiliary apparatus.

It is necessary, of course, to maintain the refrigeration in both the primary and auxiliary apparatus. This may be accomplished by expansion of a portion of the gaseous mixture under the initial high pressure before it is liquefied in the primary operation. The other portion of the gaseous mixture at high pressure may be liquefied without expansion in the usual type of liquefier provided in liquefaction systems. The refrigeration of the auxiliary apparatus can be obtained readily by returning a portion of the pure oxygen liquid produced by the primary operation and evaporating it in a special compartment in the auxiliary apparatus. Additional refrigeration can be secured by utilizing a gaseous product of the primary operation, for example, a portion of the effluent in a liquefier in which part of the gaseous mixture at low pressure is liquefied before it enters the auxiliary apparatus. By suitably regulating the amount of liquid returned to the auxiliary apparatus and the amount of the gaseous product which is supplied to the liquefier, it is possible to maintain the refrigeration balance in the apparatus so that the operation will proceed smoothly and with the minimum of attention and adjustment.

In the operation as described it is possible to obtain a large proportion of the less volatile constituent, for example, oxygen which is present in the gaseous mixture treated and the recovery of this constituent is increased in proportion to the amount of impure liquid containing that constituent which is delivered to the primary rectifier as the result of the auxiliary rectification. It is possible also to obtain a large volume of the more volatile constituent in substantial purity and if the operation is conducted in a continuous cycle without the addition of the original gaseous mixture to the auxiliary apparatus, a substantially complete separation of the constituents of the gaseous mixture entering the apparatus can be accomplished.

The invention is of general application in liquefaction systems such as are utilized commercially for the production of oxygen and nitrogen from the atmosphere, but it will be described hereinafter with reference to the drawing which shows a modified form of apparatus employing the principles of expansion with external work which characterizes one of the well known liquefaction systems.

Referring to the drawing, 5 and 6 indicate respectively the primary and auxiliary rectification columns. The gaseous mixture to be separated enters the apparatus through a pipe 7 after compression and purification, the gaseous mixture being at the pressure which is necessary to maintain the refrigeration of the system. After passing through an exchanger 8 the gaseous mixture is delivered through a pipe 9 having branches 10 and 11, the former being connected to a liquefier 12. The liquid produced in the liquefier by heat exchange with gaseous products of the operation as hereinafter described is delivered through a pipe 13 controlled by a valve 14 to the column 5. That portion of the gaseous mixture which passes through the pipe 11 enters and is expanded in an engine or turbine 15 and is delivered therefrom through a pipe 16 to the column 5.

The column 5 is divided by a partition 17 into a compartment 18 communicating with the pipes 13 and 16 and an upper vaporizing and rectifying compartment 19. In the compartment 18 a plurality of trays 20 of the usual type employed in rectifiers permits an initial contact between the gaseous mixture entering through the pipe 16 and the liquid delivered to the compartment through the pipe 13 as well as an additional quantity of liquid which is formed by the passage of the gaseous mixture through a plurality of tubes 21. In rising through the tubes the gaseous mixture is subjected to selective liquefaction and consequent separation of the less volatile constituent. The liquid runs backwardly through the tubes in contact with the entering gaseous mixture to effect a further separation in accordance with the well known principles of "backward return" condensation, and after passing over the trays 20 with the liquid delivered through the pipe 13 the accumulated liquid passes through a pipe 22 and a pressure-reducing valve 23 and is delivered upon the trays 24 in the upper part of the compartment 19. The liquid flows downwardly over the trays and is subjected to the rectifying action with the resultant separation of the more volatile constituent and the final accumulation of a liquid consisting of the less volatile constituent in substantial purity at the bottom of the compartment 19 where it surrounds the tubes 21. The partial evaporation of this liquid to maintain the rectification ensures the continued liquefaction of the gaseous mixture in the tubes.

The unliquefied residue of the gaseous mixture in the tubes escapes to a header 25 and passes thence through a pipe 26 to a condenser consisting of a plurality of tubes 27 disposed in the upper part of the compartment 19 where the tubes are surrounded by liquid accumulated in a container 28. In passing through the tubes 27 the gaseous residue is liquefied by evaporating a portion of the liquid in the container 28 and the liquid thus formed passes through a pipe 29 and pressure-reducing valve 30 and enters the column at the top of the compartment 19. This is the "reflux" liquid which ensures the maximum separation of the more readily condensable constituent in the rectification which is operated as hereinbefore described so that the effluent escaping through the pipe 31 at the top of the primary column contains all of the more volatile constituent of the gaseous mixture with that proportion of the less volatile constituent which must be evaporated in order to ensure the purity of the liquid which accumulates in the bottom of the compartment 19.

The auxiliary column 6 is divided by partitions 32 and 33 into a compartment 34, a special vaporizing compartment 35 and a vaporizing and rectifying compartment 36. The gaseous mixture to be treated in the auxiliary column is compressed in an auxiliary compressor 37 to a pressure somewhat lower than that at which the gaseous mixture for the initial separation is compressed. This low pressure gaseous mixture travels through a pipe 38 to an exchanger 39 and thence through a pipe 40 to a liquefier 41. The liquid produced in the liquefier 41 is delivered through a pipe 42 to the compartment 34 of the auxiliary column 6 together with the balance of the gaseous mixture which is not reduced to a liquid condition in the liquefier. The gaseous mixture travels upwardly in a plurality of tubes 43 and is therein subjected to "backward return" condensation by heat exchange with liquid in the compartment 35 and in the bottom of the compartment 36. The liquid in the compartment 35 is derived from the primary column and is delivered thereto through a pipe 44 controlled by a valve 45. The liquid which accumulates in the compartment 34 of the column 6 as the result of liquefaction in the tubes 43 and in the liquefier 41 is delivered through a pipe 46 and pressure-reducing valve 47 to the middle section of the compartment 36. It flows downwardly over trays 48 in the column and is rectified in the usual manner to separate the more volatile constituent, for example, nitrogen, while the less volatile constituent, for example, oxygen accumulates around the tubes 43 and is partially evaporated to maintain the liquefaction in the tubes.

The residual unliquefied gas in the tubes escapes to a header 49 and passes thence through a pipe 50 to a condenser consisting of a plurality of tubes 51 in the middle section of the compartment 36. In passing through the tubes 51 the residual gas is liquefied and the liquid is delivered through a pipe 52 and pressure-reducing valve 53 to the top 52 of the compartment 36. This liquid flows downwardly over the trays 48 in contact with the vapors rising through the column and thus ensures the further rectification of these vapors. The liquid accumulates in a receptacle 54 surrounding the tubes 51 and overflows upon the lower trays 48.

The rectification in the auxiliary column is conducted so as to separate an effluent which escapes from the top of the auxiliary column through a pipe 55 and consists of the more volatile constituent, for example, nitrogen in substantial purity. In so conducting the operation the liquid which accumulates in the bottom of the compartment 36 is contaminated necessarily with a proportion of the more volatile constituent and is, therefore, for example, an impure oxygen liquid. This liquid, together with some vapor if necessary, is delivered through pipes 56 and 56' controlled by valves 57 and 57' to the primary rectification column at a point where the liquid flowing downwardly therein has a composition corresponding substantially to that of the liquid produced in the auxiliary column. This impure liquid containing, for example, a large proportion of oxygen and some nitrogen affords a substantial addition to the oxygen content of the liquid flowing downwardly in the primary column and, as previously described, the rectification of the combined liquids is conducted so that the resulting liquid consists of the less volatile constituent, for example, oxygen in substantial purity.

The liquid consisting, for example, of substantially pure oxygen which is vaporized in the compartment 35 of the auxiliary column 6 and of a portion of the vapor produced from the same liquid in the primary column 5, is withdrawn through pipes 58 and 59 respectively. These pipes communicate with a pipe 60 leading to a compartment 61 of the liquefier 12 and the gas passes through tubes 62 of the liquefier to a corresponding compartment 63 at the opposite end thereof. From the compartment 63 the gas passes through a pipe 64 to a compartment 65 at one end of the exchanger 8 and after passing through the tubes 66 of the exchanger to a compartment 67 thereof the gas may be withdrawn through a pipe 68 controlled by a valve 69 and delivered to any suitable storage receptacle. In passing through the tubes of the liquefier 12 and the exchanger 8 the cold gaseous product of the operation is utilized to cool the incoming gaseous mixture.

The effluent from the primary column escaping through the pipe 31 is delivered in part to a pipe 70 while the balance passes through a pipe 71. The pipe 70 communicates with a compartment 72 at one end of the liquefier 12 and the gas passes through tubes 73 from this compartment to a corresponding compartment 74 at the opposite end of the liquefier. Thence the gas passes through a pipe 75 controlled by a valve 76 to a compartment 77 at one end of the exchanger 8. Tubes 78 convey the gas to a compartment 79 at the opposite end of the exchanger and the gas escapes through a pipe 80 controlled by a valve 81. A branch 82 controlled by a valve 83 is connected to the inlet 84 of the compressor 37 so that the impure effluent from the primary column can be recompressed and circulated through the auxiliary column. Any other gaseous mixture, for example, air can be introduced to the inlet 84 through a valve 85 either to make up the amount of gas required in the auxiliary operation or as a substitute for the effluent from the primary operation.

That portion of the effluent from the primary column passes through the pipe 71, enters a compartment 86 at one end of the liquefier 41 and passes through tubes 87 therein to a compartment 88 at the opposite end of the liquefier. From this compartment the gas may be delivered through a pipe 89 controlled by a valve 90 to the pipe 75 leading to the exchanger 8, or all or a portion of this gas can be diverted through a pipe 91 to a compartment 92 at one end of the exchanger 39. After passing through tubes 93 the gas is delivered to a compartment 94 and thence to an outlet 95 controlled by a valve 96.

The effluent from the auxiliary column 6 which constitutes one of the pure products of the operation escapes through the pipe 55 to a compartment 97 at one end of the liquefier 41 and passes through tubes 98 to a compartment 99 at the opposite end of the liquefier. Thence the gas passes through a pipe 100 to a compartment 101 and one end of the exchanger 39 and enters the tubes 102 of the exchanger. After passing through the tubes the gas is delivered to a compartment 103 and is withdrawn through a pipe 104 controlled by a valve 105. In passing through the tubes of the liquefier 41 and the exchanger 39 the gaseous products serve to cool the incoming gaseous mixture at low pressure which is treated in the auxiliary column 6. It will be noted particularly that a portion of the refrigeration in the liquefier 41 is derived from the effluent produced by the primary rectification, and to the extent that refrigeration is transferred in this way from the primary operation the amount of liquid which must be delivered to the compartment 35 through the pipe 44 is reduced. The operation can be balanced readily by adjusting the valves to permit the desired amounts of liquid and gaseous products to pass from the primary to the auxiliary column. The amount of liquid delivered to the auxiliary column should approximate roughly the amount of liquid which is withdrawn therefrom and delivered to the primary column through the pipe 56.

The method and apparatus as herein described are designed to accomplish the separation of the constituents of a gaseous mixture and to secure the continuous delivery of two such constituents in substantial purity with the minimum application of energy for the compression of the gaseous mixture. The pressure of the gas which enters the auxiliary column may be materially lower than that which is necessary in the primary column because it is possible to produce surplus refrigeration in the primary operation and to utilize this in the separation of the more volatile constituent. A relatively large volume of the gas can be treated at a comparatively low pressure with consequent saving in power cost. Another advantage of the method and apparatus as described is that the separation of the two constituents for the purpose of recovering pure products is accomplished under the best possible conditions and with the minimum requirement for careful regulation. In the separate rectifications it is necessary only to ensure the production of one of the constituents in a pure condition. The separation of the constituents of the balance of the product is conducted automatically in the other part of the system. The method and apparatus are adapted, therefore, for application and commercial use and are capable of highly efficient operation and control.

Various changes may be made in the details of the operation as well as in the apparatus employed without departing from the invention or sacrificing any of the advantages thereof.

We claim:—

1. A method of separating the constituents of gaseous mixtures, which comprises subjecting a liquid containing the constituents of the gaseous mixture to a primary rectification to form a liquid consisting of one of the constituents in substantial purity, subjecting a gaseous mixture containing the constituents of the original mixture and including the effluent from the primary rectification to liquefaction and an auxiliary rectification to separate another constituent as a gas in substantial purity and delivering the impure liquid product of the auxiliary rectification to the primary rectification at a point where the liquid flowing downwardly therein has a composition corresponding substantially to that of the liquid produced in the auxiliary rectification.

2. A method of separating the constituents of gaseous mixtures, which comprises subjecting the gaseous mixture to liquefaction and a primary rectification to form a liquid consisting of one of the constituents in substantial purity, subjecting a gaseous mixture containing the constituents of the original gaseous mixture and including the effluent from the primary rectification to liquefaction and an auxiliary rectification to separate another constituent as a gas in substantial purity, delivering the liquid product of the auxiliary rectification to the primary rectification and returning the liquid product of the primary rectification to maintain the refrigeration in the auxiliary rectification.

3. A method of separating the constituents of gaseous mixtures, which comprises subjecting the gaseous mixture to liquefaction and a primary rectification to form a liquid consisting of one of the constituents in substantial purity, subjecting a gaseous mixture containing the constituents of the original gaseous mixture and including the effluent from the primary rectification to liquefaction and an auxiliary rectification to separate another constituent as a gas in substantial purity, delivering the liquid product of the auxiliary rectification to the primary rectification and cooling the gaseous mixture intended for the auxiliary rectification by heat exchange with cold products of the primary rectification.

4. A method of separating the constituents of gaseous mixtures, which comprises subjecting the gaseous mixture to liquefaction and a primary rectification to form a liquid consisting of one of the constituents in substantial purity, subjecting a gaseous mixture containing the constituents of the original gaseous mixture and including the effluent from the primary rectification to liquefaction and an auxiliary rectification to separate another constituent as a gas in substantial purity, delivering the liquid product of the auxiliary rectification to the primary rectification and cooling the gaseous mixture intended for the auxiliary rectification by heat exchange with a cold gaseous product of the primary rectification.

5. A method of separating the constituents of gaseous mixtures, which comprises subjecting the gaseous mixture to liquefaction and a primary rectification to form a liquid consisting of one of the constituents in substantial purity, subjecting a gaseous mixture containing the constituents of the original gaseous mixture and including the effluent from the primary rectification to liquefaction and an auxiliary rectification to separate another constituent as a gas in substantial purity, delivering the liquid product of the auxiliary rectification to the primary rectification, cooling the gaseous mixture intended for the auxiliary rectification by heat exchange with a cold gaseous product of the primary rectification and returning the liquid product of the primary rectification to maintain the refrigeration in the auxiliary rectification.

6. A method of separating the constituents of gaseous mixtures, which comprises subjecting the gaseous mixture to liquefaction and a primary rectification to form a liquid consisting of one of the constituents in substantial purity, subjecting the effluent from the primary rectification to liquefaction and an auxiliary rectification to separate another constituent as a gas in substantial purity and delivering the liquid product of the auxiliary rectification to the primary rectification.

7. A method of separating the constituents of gaseous mixtures, which comprises subjecting the gaseous mixture to liquefaction and a primary rectification to form a liquid consisting of one of the constituents in substantial purity, subjecting the effluent from the primary rectification with an additional quantity of the original gaseous mixture to liquefaction and an auxiliary rectification to separate another constituent as a gas in substantial purity and delivering the liquid product of the auxiliary rectification to the primary rectification.

8. A method of separating the constituents of gaseous mixtures, which comprises subjecting the gaseous mixture to liquefaction and a primary rectification to form a liquid consisting of one of the constituents in substantial purity, subjecting the effluent from the primary rectification to liquefaction and an auxiliary rectification to separate another constituent as a gas in substantial purity, delivering the liquid product of the auxiliary rectification to the primary rectification and returning the liquid product of the primary rectification to maintain the refrigeration in the auxiliary rectification.

9. A method of separating the constituents of gaseous mixtures, which comprises subjecting the gaseous mixture to liquefaction and a primary rectification to form a liquid consisting of one of the constituents in substantial purity, subjecting the effluent from the primary rectification with an additional quantity of the original gaseous mixture to liquefaction and an auxiliary rectification to separate another constituent as a gas in substantial purity, delivering the liquid product of the auxiliary rectification to the primary rectification and returning the liquid product of the primary rectification to maintain the refrigeration in the auxiliary rectification.

10. A method of separating the constituents of gaseous mixtures, which comprises subjecting the gaseous mixture to liquefaction and a primary rectification to form a liquid consisting of one of the constituents in substantial purity, subjecting the effluent from the primary rectification to liquefaction and an auxiliary rectification to separate another constituent as a gas in substantial purity, delivering the liquid product of the auxiliary rectification to the primary rectification and cooling the gaseous mixture intended for the auxiliary rectification by heat exchange with cold products of the primary rectification.

11. A method of separating the constituents of gaseous mixtures, which comprises subjecting the gaseous mixture to liquefaction and a primary rectification to form a liquid consisting of one of the constituents in substantial purity, subjecting the effluent from the primary rectification with an additional quantity of the original gaseous mixture to liquefaction and an auxiliary rectification to separate another constituent as a gas in substantial purity, delivering the liquid product of the auxiliary rectification to the primary rectification and cooling the gaseous mixture intended for the auxiliary rectification by heat exchange with cold products of the primary rectification.

12. A method of separating the constituents of gaseous mixtures, which comprises subjecting the gaseous mixture to liquefaction and a primary rectification to form a liquid consisting of one of the constituents in substantial purity, subjecting the effluent from the primary rectification to liquefaction and an auxiliary rectification to separate another constituent as a gas in substantial purity, delivering the liquid product of the auxiliary rectification to the primary rectification and cooling the gaseous mixture intended for the auxiliary rectification by heat exchange with a cold product of the primary rectification.

13. A method of separating the constituents of gaseous mixtures, which comprises subjecting the gaseous mixture to liquefaction and a primary rectification to form a liquid consisting of one of the constituents in substantial purity, subjecting the effluent from the primary rectification with an additional quantity of the original gaseous mixture to liquefaction and an auxiliary rectification to separate another constituent as a gas in substantial purity, delivering the liquid product of the auxiliary rectification to the primary rectification and cooling the gaseous mixture intended for the auxiliary rectification by heat exchange with a cold product of the primary rectification.

14. A method of separating the constituents of gaseous mixtures which comprises subjecting the gaseous mixture to liquefaction and a primary rectification to form a liquid consisting of one of the constituents in substantial purity, subjecting the effluent from the primary rectification to liquefaction and an auxiliary rectification to separate another constituent as a gas in substantial purity, delivering the liquid product of the auxiliary rectification to the primary rectification, cooling the gaseous mixture intended for the auxiliary rectification by heat exchange with a cold product of the primary rectification and returning the liquid product of the primary rectification to maintain the refrigeration in the auxiliary rectification.

15. A method of separating the constituents of gaseous mixtures, which comprises subjecting the gaseous mixture to liquefaction and a primary rectification to form a liquid consisting of one of the constituents in substantial purity, subjecting the effluent from the primary rectification with an additional quantity of the original gaseous mixture to liquefaction and an auxiliary rectification to separate another constituent as a gas in substantial purity, delivering the liquid product of the auxiliary rectification to the primary rectification, cooling the gaseous mixture intended for the auxiliary rectification by heat exchange with a cold product of the primary rectification and returning the liquid product of the primary rectification to maintain the refrigeration in the auxiliary rectification.

In testimony whereof we affix our signatures.

CLAUDE C. VAN NUYS.
JOSEPH L. SCHLITT.